United States Patent
Shi et al.

(10) Patent No.: US 11,875,596 B2
(45) Date of Patent: Jan. 16, 2024

(54) DISPLAY PANEL AND DISPLAY APPARATUS

(71) Applicant: BOE Technology Group Co., Ltd., Beijing (CN)

(72) Inventors: Lubin Shi, Beijing (CN); Hongrun Wang, Beijing (CN); Fuqiang Li, Beijing (CN); Wenqu Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 18 days.

(21) Appl. No.: 17/771,706

(22) PCT Filed: Mar. 12, 2021

(86) PCT No.: PCT/CN2021/080508
§ 371 (c)(1),
(2) Date: Apr. 25, 2022

(87) PCT Pub. No.: WO2022/188161
PCT Pub. Date: Sep. 15, 2022

(65) Prior Publication Data
US 2023/0162525 A1    May 25, 2023

(51) Int. Cl.
*G06F 3/041*        (2006.01)
*G06V 40/13*        (2022.01)
(Continued)

(52) U.S. Cl.
CPC ......... *G06V 40/1318* (2022.01); *G02B 27/30* (2013.01); *G02F 1/136209* (2013.01); *G02F 1/136222* (2021.01)

(58) Field of Classification Search
CPC .......... G06V 40/1318; G02F 1/136222; G02F 1/136209; G02F 1/13318; G02F 1/163; G02F 1/13338; G02B 27/30
(Continued)

(56) References Cited

U.S. PATENT DOCUMENTS

| 10,884,273 B1 * | 1/2021 | Xiao .................... G02F 1/13338 |
| 2006/0017862 A1 | 1/2006 | Song et al. |

(Continued)

FOREIGN PATENT DOCUMENTS

| CN | 1689025 A | 10/2005 |
| CN | 110275341 A | 9/2019 |

(Continued)

*Primary Examiner* — Abdul-Samad A Adediran
(74) *Attorney, Agent, or Firm* — IPro, PLLC

(57) ABSTRACT

Disclosed are a display panel and a display apparatus. The display panel includes an opposing substrate, an array substrate and a liquid crystal layer. The array substrate includes: a first base substrate; a color film layer, includes a black matrix and a plurality of color resistors, the black matrix includes a plurality of pixel openings and a plurality of first light transmitting holes, and color resistors is arranged one pixel opening correspondingly; and photosensitive sensors, arranged between the color film layer and the first base substrate, orthographic projections of the plurality of photosensitive sensors on the first base substrate are in an orthographic projection of the black matrix on the first base substrate, and the orthographic projection of each of the plurality of photosensitive sensors on the first base substrate covers an orthographic projection of at least one the plurality of first light transmitting holes on the first base substrate.

16 Claims, 14 Drawing Sheets

(51) Int. Cl.
    *G02F 1/1362*     (2006.01)
    *G02B 27/30*     (2006.01)

(58) Field of Classification Search
    USPC .......................................................... 345/87
    See application file for complete search history.

(56) References Cited

U.S. PATENT DOCUMENTS

| | | | |
|---|---|---|---|
| 2008/0246708 A1* | 10/2008 | Ishiguro | G02F 1/13318 |
| | | | 345/87 |
| 2016/0266695 A1* | 9/2016 | Bae | G06V 40/1318 |
| 2019/0056613 A1* | 2/2019 | Wang | G02F 1/163 |
| 2022/0221954 A1* | 7/2022 | Ito | G02F 1/13318 |

FOREIGN PATENT DOCUMENTS

| | | |
|---|---|---|
| CN | 10308583 A | 10/2019 |
| CN | 111291710 A | 6/2020 |
| CN | 211857087 U | 11/2020 |
| CN | 112364760 A | 2/2021 |
| KR | 20030058719 A | 7/2003 |

* cited by examiner

DISPLAY PANEL AND DISPLAY APPARATUS

CROSS REFERENCE TO RELATED APPLICATIONS

The present disclosure is a National Stage of International Application No. PCT/CN2021/080508, filed Mar. 12, 2021.

FIELD

The present disclosure relates to the technical field of display, in particular to a display panel and a display apparatus.

BACKGROUND

Fingerprint recognition has important applications in the society nowadays, and common fingerprint recognition sensors include capacitive, ultrasonic and optical sensors. The optical sensors are mainly based on photosensitive sensors, which realize fingerprint recognition by detecting a difference in light reflection between valleys and ridges.

SUMMARY

Embodiments of the present disclosure provide a display panel and a display apparatus.

In one aspect, an embodiment of the present disclosure provides a display panel, including: an opposing substrate and an array substrate arranged opposite to each other, and a liquid crystal layer located between the opposing substrate and the array substrate. The array substrate includes:
  a first base substrate;
  a color film layer, disposed on the first base substrate, wherein the color film layer comprises a black matrix and a plurality of color resistors, the black matrix comprises a plurality of pixel openings and a plurality of first light transmitting holes, and each of the plurality of color resistors is arranged each of the plurality of pixel openings correspondingly; and
  a plurality of photosensitive sensors, disposed between the color film layer and the first base substrate, wherein orthographic projections of the plurality of photosensitive sensors on the first base substrate are in an orthographic projection of the black matrix on the first base substrate, and an orthographic projection of each of the plurality of photosensitive sensors on the first base substrate covers an orthographic projection of at least one of the plurality of first light transmitting holes on the first base substrate.

In some embodiments, the opposing substrate includes a second base substrate and a light-shielding layer disposed on the second base substrate.

The light-shielding layer includes a plurality of second light transmitting holes, and orthographic projections of the plurality of second light transmitting holes on the first base substrate mutually overlap with orthographic projections of the plurality of first light transmitting holes on the first base substrate.

In some embodiments, the orthographic projections of the plurality of second light transmitting holes on the first base substrate roughly coincide with the orthographic projections of the plurality of first light transmitting holes on the first base substrate; and centers of the orthographic projections of the plurality of second light transmitting holes on the first base substrate roughly coincide with centers of the orthographic projections of the plurality of first light transmitting holes on the first base substrate.

In some embodiments, the light-shielding layer includes:
  a collimation film attached to the second base substrate;
  the collimation film is arranged as an entire surface; or
  an orthographic projection of the collimation film on the first base substrate is in the orthographic projection of the black matrix on the first base substrate.

In some embodiments, the collimation film includes: a collimation hole layer; and
  a flexible basal body layer and a collimating lens layer sequentially disposed on a side facing away from the second base substrate, of the collimation hole layer;
  the collimating lens layer includes: a micro lens array, and a spot area adjustment layer arranged between the micro lens array and the flexible basal body layer;
  the collimation hole layer includes: a plurality of light-shielding parts, and a collimation hole array arranged among the light-shielding parts, the collimation hole array is roughly identical to the micro lens array in distribution, and each collimation hole in the collimation hole array is on a primary optical axis of a corresponding micro lens; and
  the collimation holes are the second light transmitting holes, and in a region where the photosensitive sensors are located, orthographic projections of the correspondingly arranged collimation hole, the micro lens and the first light-transmitting hole on the first base substrate overlap with each other.

In some embodiments, the collimation film includes at least two collimation hole layers arranged in a laminated mode and a light transmitting layer arranged between every two adjacent collimation hole layers;
  each collimation hole layer includes a plurality of light-shielding parts and a collimation hole array arranged among the light-shielding parts;
  the collimation hole arrays is roughly identical in distribution, and centers of orthographic projections of correspondingly arranged collimation holes on the first base substrate roughly coincide with each other; and
  the collimation holes are the second light transmitting holes, and in a region where the photosensitive sensors are located, an orthographic projection of each collimation hole on the first base substrate correspondingly overlaps with an orthographic projection of the corresponding first light transmitting hole on the first base substrate.

In some embodiments, the opposing substrate further includes: a polarizer disposed on a side facing away from the liquid crystal layer, of the second base substrate;
  the collimation film is arranged between the second base substrate and the polarizer.

In some embodiments, the opposing substrate further includes: a polarizer and a protective cover plate disposed on a side facing away from the liquid crystal layer, of the second base substrate; and
  the collimation film is arranged between the polarizer and the protective cover plate; or
  the collimation film is disposed on a side facing away from the second base substrate, of the protective cover plate.

In some embodiments, the opposing substrate further includes: an adhesive layer disposed on a side facing the second base substrate, of the collimation film; and/or
  an adhesive layer disposed on a side of the collimation film facing away from the second base substrate.

In some embodiments, the light-shielding layer includes:
a light-shielding pattern formed through patterning on the
second base substrate;
   an orthographic projection of the light-shielding pattern
      on the first base substrate is in the orthographic projection of the black matrix on the first base substrate.
In some embodiments, the light-shielding pattern is disposed on a side facing the liquid crystal layer, of the second base substrate.
In some embodiments, the opposing substrate further includes a protective cover plate disposed on a side facing away from the liquid crystal layer, of the second base substrate;
   the light-shielding pattern is disposed on a side facing the liquid crystal layer, of the protective cover plate.
In some embodiments, shapes of the first light transmitting holes and the second light transmitting holes are circular, and hole diameters of the first light transmitting holes and the second light transmitting holes range from 3 μm to 6 μm.
In some embodiments, the array substrate further includes: a common electrode and a plurality of pixel electrodes;
   the plurality of pixel electrodes are disposed on a side facing away from the first base substrate, of the color film layer; and the common electrode is arranged between a layer where the plurality of pixel electrodes are located and the color film layer; and
   orthographic projections of the pixel electrodes on the first base substrate mutually overlap with an orthographic projection of the common electrode on the first base substrate at the pixel openings.
In some embodiments, the array substrate further includes: a plurality of pixel electrodes disposed on the side facing away from the first base substrate, of the color film layer;
   orthographic projections of the pixel electrodes on the first base substrate are in orthographic projections of the color resistors on the first base substrate; and
   the opposing substrate further includes: an orientation layer and a common electrode, the orientation layer is in contact with the liquid crystal layer, and the common electrode is disposed on a side facing away from the liquid crystal layer, of the orientation layer.
In some embodiments, each of the plurality of photosensitive sensor includes a first electrode and a second electrode arranged opposite to each other, and a photosensitive layer arranged between the first electrode and the second electrode; and the photosensitive layer includes a P-type semiconductor layer, an intrinsic semiconductor layer and an N-type semiconductor layer which are arranged in a laminated mode.

In another aspect, an embodiment of the present disclosure provides a display apparatus, including the above display panel and a backlight module. The display panel is disposed on a light emitting side of the backlight module.

DETAILED DESCRIPTION OF THE EMBODIMENTS

Figure 1:
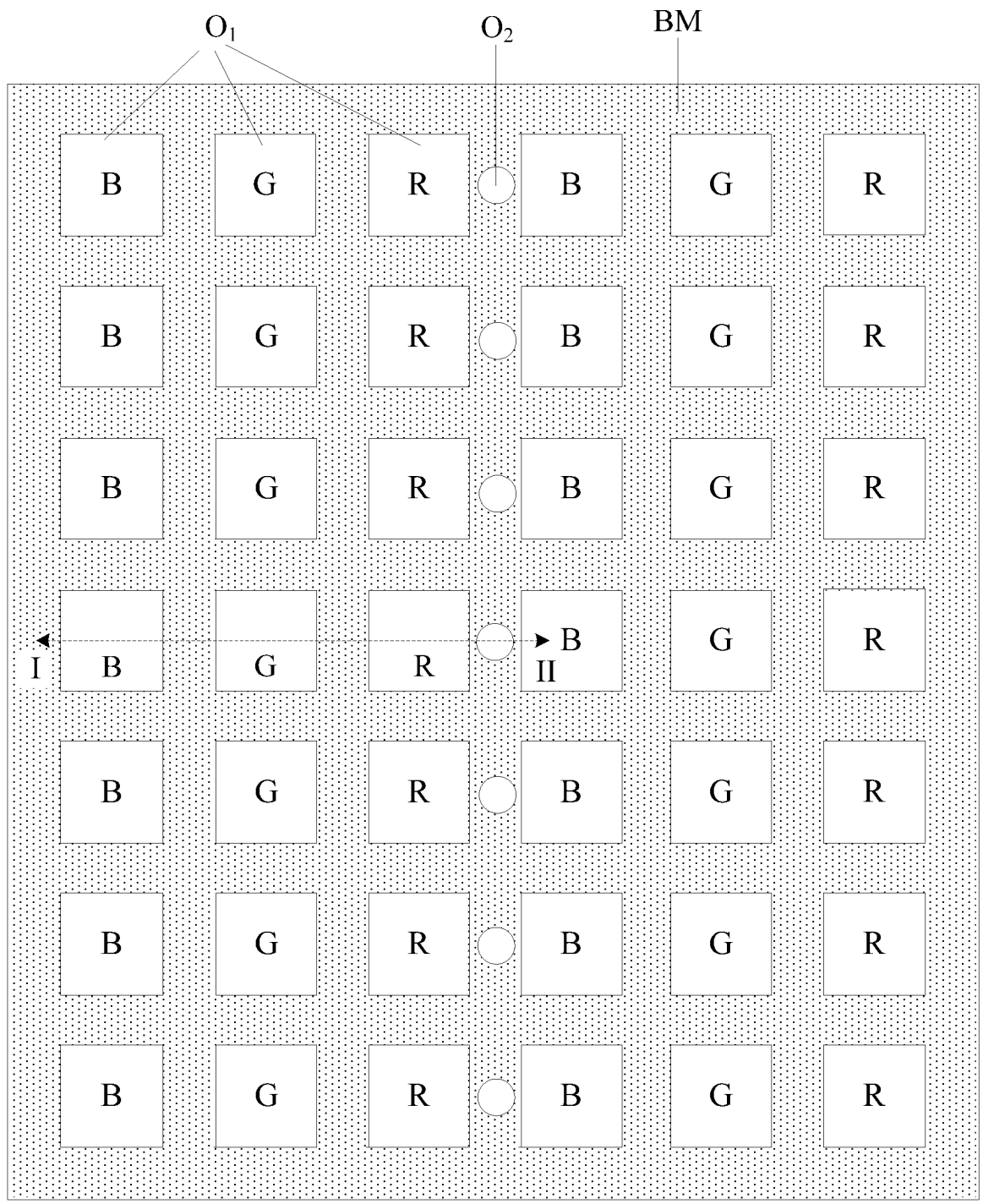
FIG. 1 is a schematic structural diagram of a display panel provided by an embodiment of the present disclosure.

In order to make objectives, technical solutions and advantages of embodiments of the present disclosure clearer, the technical solutions of the embodiments of the present disclosure will be clearly and completely described below with reference to the accompanying drawings of the embodiments of the present disclosure. Sizes and shapes of figures in the drawings do not reflect a true scale, and are only intended to illustrate the present disclosure. Obviously, the described embodiments are a part of embodiments of the present disclosure, rather than all the embodiments. Based on the described embodiments of the present disclosure, all other embodiments obtained by those of ordinary skill in the art without creative efforts fall within the protection scope of the present disclosure.

Unless otherwise defined, technical or scientific terms used herein shall have the ordinary meaning as understood by those of ordinary skill in the art to which the present disclosure belongs. "First", "second" and similar words used in the specification and the claims of the present disclosure do not represent any order, quantity, or importance, but are merely used to distinguish different components. Similar words such as "comprise" or "include" mean that elements or items appearing before the words encompass elements or items recited after the words and their equivalents, but do not exclude other elements or items. Similar words such as "connected" or "linked" are not limited to physical or mechanical connections, but may include electrical connections, whether direct or indirect. "Inner", "outer", "upper", "lower", etc. are only used to indicate a relative positional relationship, and when an absolute position of a described object changes, the relative positional relationship may also change accordingly.

A liquid crystal display is generally fabricated in a box-to-box manner by using an array substrate and a color filter (CF) substrate. Due to limitation of box-to-box accuracy, a width of a black matrix (BM) contained in the color filter substrate is generally designed to be larger than an area of a liquid crystal uncontrollable region (i.e. a gap between pixel electrodes) to prevent a phenomenon of light leakage. However, an increase of the width of the black matrix will result in a decrease of a pixel aperture ratio. For a solution of integrating a photosensitive sensor on the array substrate to realize fingerprint recognition, since the photosensitive sensor needs to occupy a certain wiring space, the pixel aperture ratio is further reduced. In addition, due to a long distance between the photosensitive sensor on the array substrate and an opening of the black matrix on the color filter substrate, it is difficult to adjust an optical path, which is prone to affecting a resolution of the photosensitive sensor.

Figure 2:
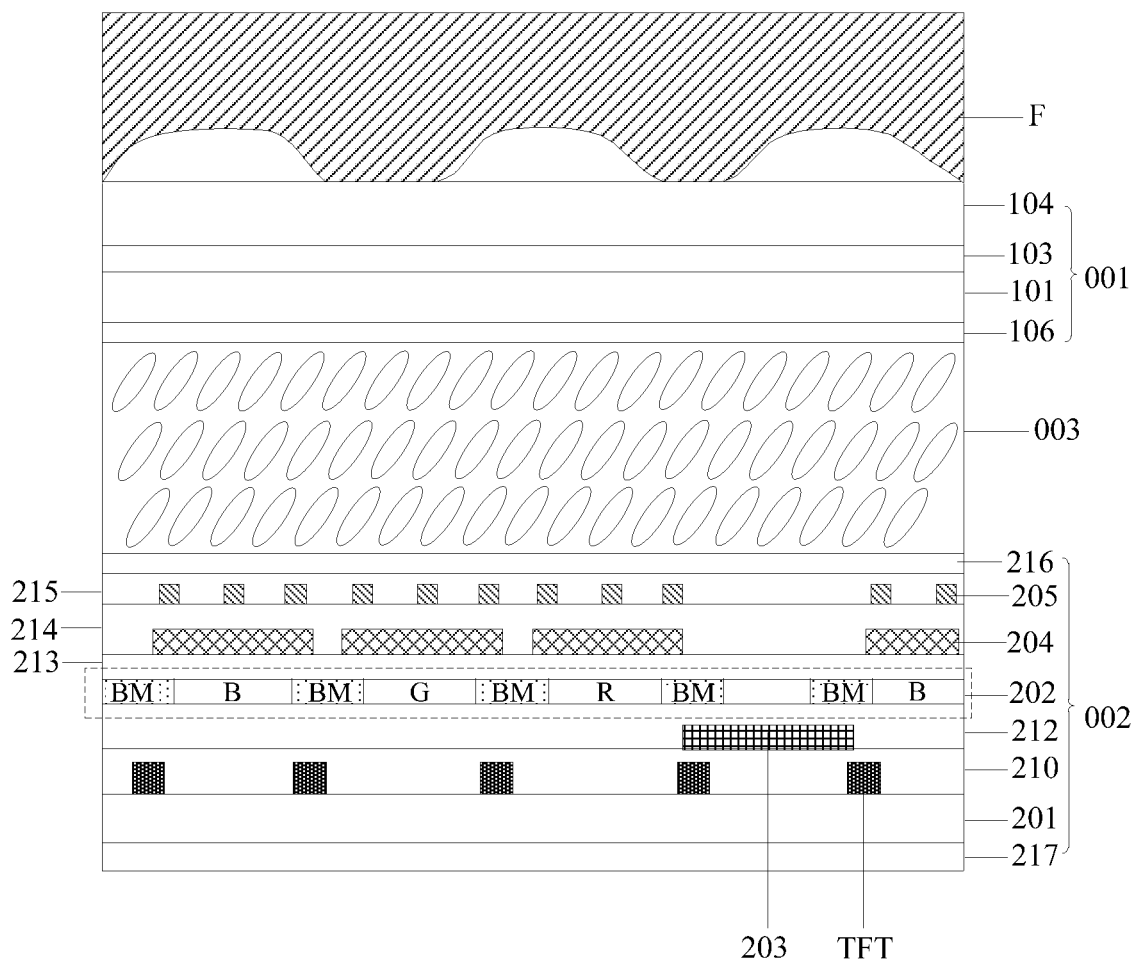
FIG. 2 is a schematic sectional view along a line I-II in FIG. 1.
Figure 3:
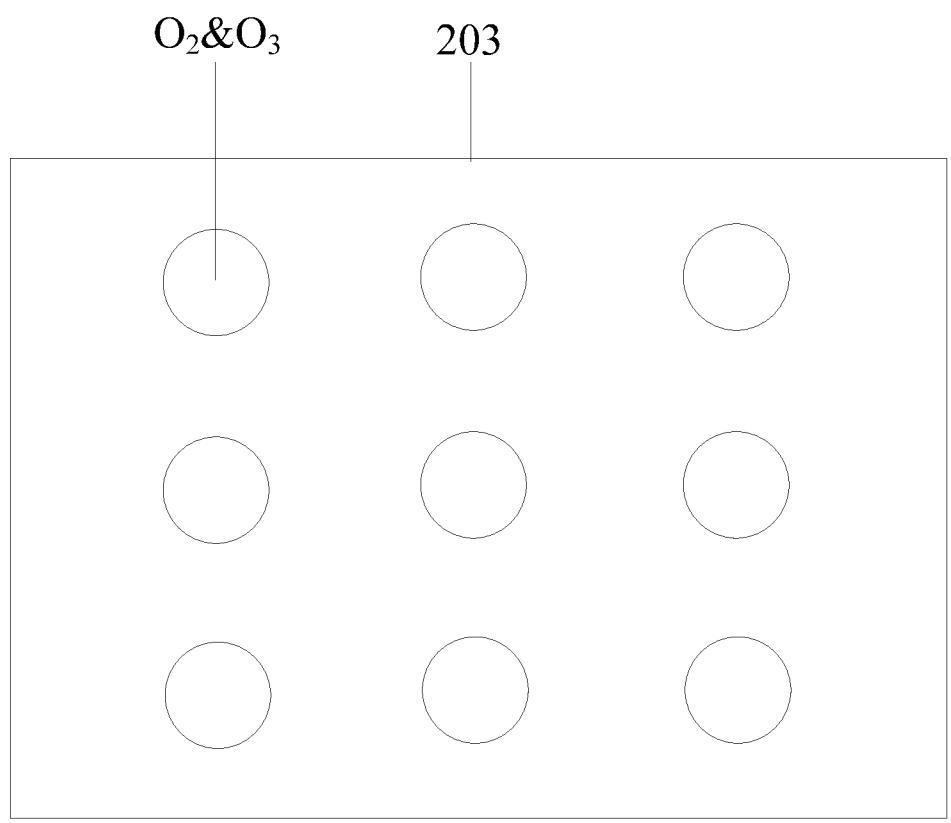
FIG. 3 is a schematic diagram of a correspondence relationship between a photosensitive sensor and a first light transmitting hole provided by an embodiment of the present disclosure.

In order to solve the above technical problem in the related art, an embodiment of the present disclosure provides a display panel, as shown in FIG. 1 to FIG. 3, including: an opposing substrate 001 and an array substrate 002 arranged opposite to each other, and a liquid crystal layer 003 located between the opposing substrate 001 and the array substrate 002. The array substrate 002 may include:

a first base substrate 201;

a color film layer 202, disposed on the first base substrate 201, where the color film layer 202 includes a black matrix BM and a plurality of color resistors, the black matrix BM includes a plurality of pixel openings O1 and a plurality of first light transmitting holes O2, each of the plurality of color resistors is arranged each of the plurality of pixel openings O1 correspondingly, and the color resistors include but are not limited to a red light color resistor R, a green light color resistor G and a blue light color resistor B; and a plurality of photosensitive sensors 203, disposed between the color film layer 202 and the first base substrate 201, where orthographic projections of the plurality of photosensitive sensors 203 on the first base substrate 201 are in an orthographic projection of the black matrix BM on the first base substrate 201, and an orthographic projection of each of the plurality of photosensitive sensors 203 on the first base substrate 201 covers an orthographic projection of at least one of the plurality of first light transmitting holes O2 on the first base substrate 201. In some embodiments, as shown in FIG. 2, one photosensitive sensor 203 corresponds to one first light transmitting hole O2; and in some other embodiments, as shown in FIG. 3, one photosensitive sensor 203 corresponds to nine first light transmitting holes O2.

In the above display panel provided by embodiments of the present disclosure, the color film layer 202 is fabricated on the array substrate, so a box alignment process of the color film layer 202 and the array substrate is avoided; and therefore, a width of the black matrix BM does not need to be increased and a relatively high pixel aperture ratio is ensured, which is more applicable to a high-resolution liquid crystal display product. In addition, since the black matrix BM and the photosensitive sensors 203 are all located on the array substrate, distances between the photosensitive sensors 203 and the first light transmitting holes O2 of the black matrix BM are relatively short, so an optical path is convenient to adjust and resolutions of the photosensitive sensors 203 are increased.

It should be noted that, FIG. 1 only illustratively gives an arrangement manner of the color resistors 104. During specific implementation, there may also be other arrangement manners known to those of skill in the art, which is not limited here. In addition, FIG. 1 only illustrates a situation that a column gap between the blue light color resistors B and the red light color resistors R has the photosensitive sensors 203 (corresponding to locations of the first light transmitting holes $O_2$). In some embodiments, the photosensitive sensors 203 may also be arranged at a column gap between the blue light color resistors B and the green light color resistors G, a column gap between the red light color resistors R and the green light color resistors G, row gaps among the color resistors.

In some embodiments, as shown in FIG. 3 to FIG. 10, the opposing substrate 001 includes a second base substrate 101 and a light-shielding layer 102 disposed on the second base substrate 101. The light-shielding layer 102 includes a plurality of second light transmitting holes $O_3$, and orthographic projections of the plurality of second light transmitting holes $O_3$ on the first base substrate 201 mutually overlap with orthographic projections of the plurality of first light transmitting holes $O_2$ on the first base substrate 201. Light with a smaller angle in reflected light of a finger F may be irradiated to photosensitive surfaces of the photosensitive sensors 203 through the first light transmitting holes $O_2$ and the second light transmitting holes $O_3$ which mutually overlap with each other, thereby effectively avoiding a situation that an accuracy of fingerprint recognition is interfered by large angle light reflected by different valleys and ridges. In addition, a material of the light-shielding layer 102 may be black resin and the like.

In some embodiments, in order to achieve a relatively good collimation effect, as shown in FIG. 3, the orthographic projections of the plurality of second light transmitting holes 3 on the first base substrate 101 roughly coincide with the orthographic projections of the plurality of first light transmitting holes $O_2$ on the first base substrate 101, and centers of the orthographic projections of the plurality of second light transmitting holes $O_3$ on the first base substrate 101 roughly coincide with centers of the orthographic projections of the plurality of first light transmitting holes $O_2$ on the first base substrate 101.

It should be understood that, in practical process, due to limitation of process conditions, alignment accuracy or influence of other factors, "roughly coinciding" above may be fully coinciding, or there may be some deviation, so a relationship of "roughly coinciding" between the above features belongs to the protection scope of the present disclosure as long as it satisfies an allowed error.

In some embodiments, in order to achieve the relatively good collimation effect, shapes of the first light transmitting holes $O_2$ and the second light transmitting holes $O_3$ may be circular, and hole diameters of the first light transmitting holes $O_2$ and the second light transmitting holes $O_3$ may be range from 3 μm to 6 μm. Of course, the shapes of the first light transmitting holes $O_2$ and the second light transmitting holes $O_3$ may also be square or other shapes, as long as an effect of collimating small-angle light can be achieved.

Figure 4:
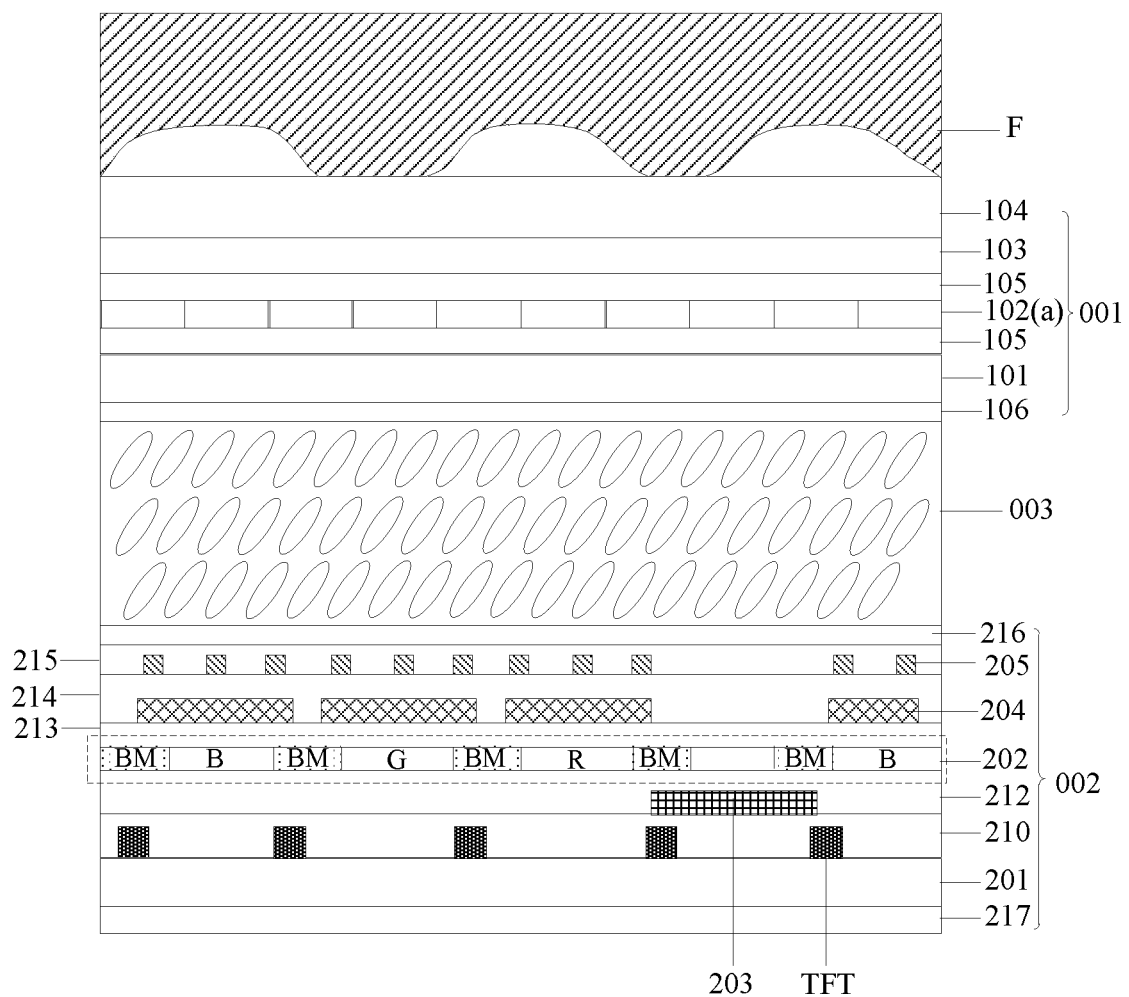
FIG. 4 is another schematic sectional view along a line I-II in FIG. 1.
Figure 5:
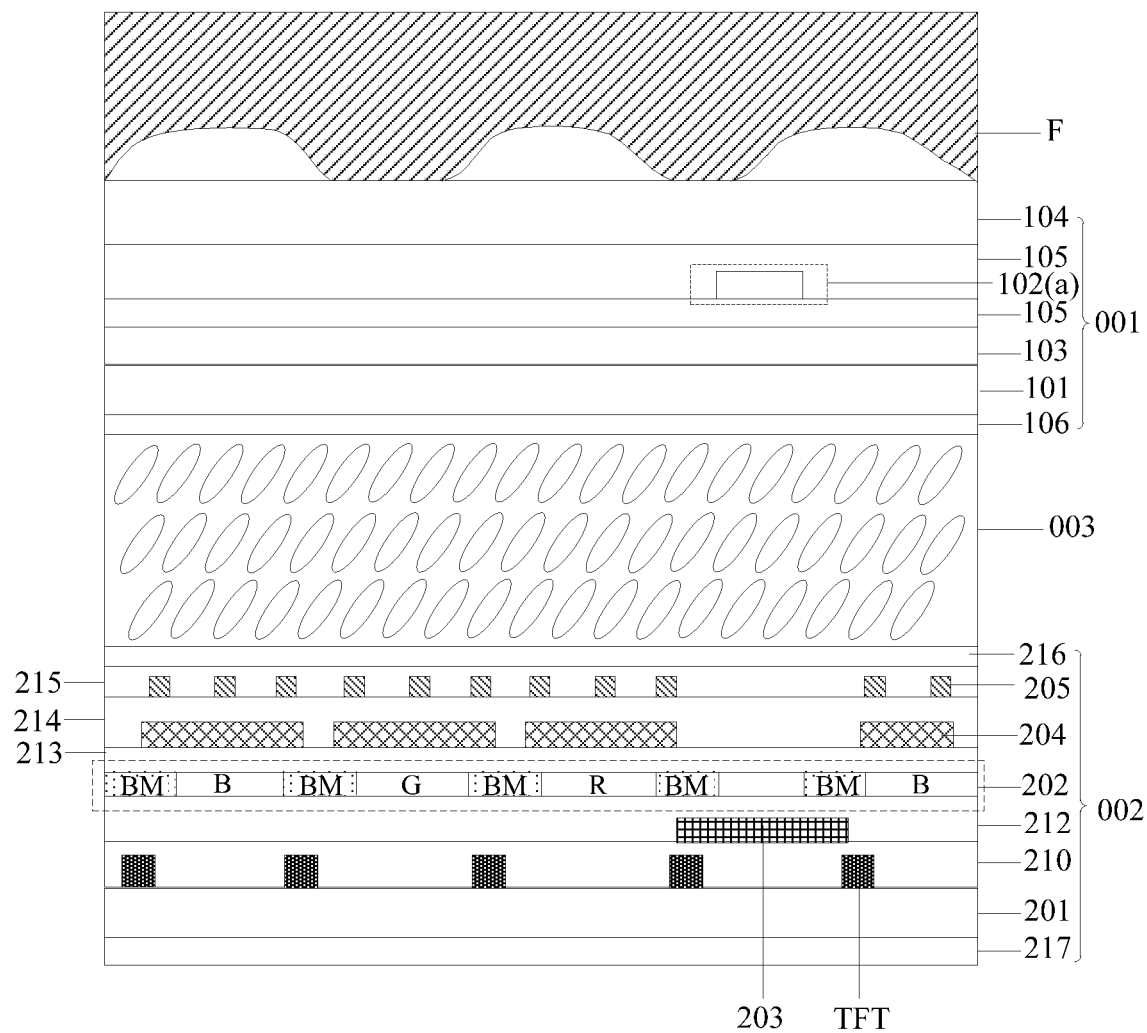
FIG. 5 is yet another schematic sectional view along a line I-II in FIG. 1.
Figure 6:
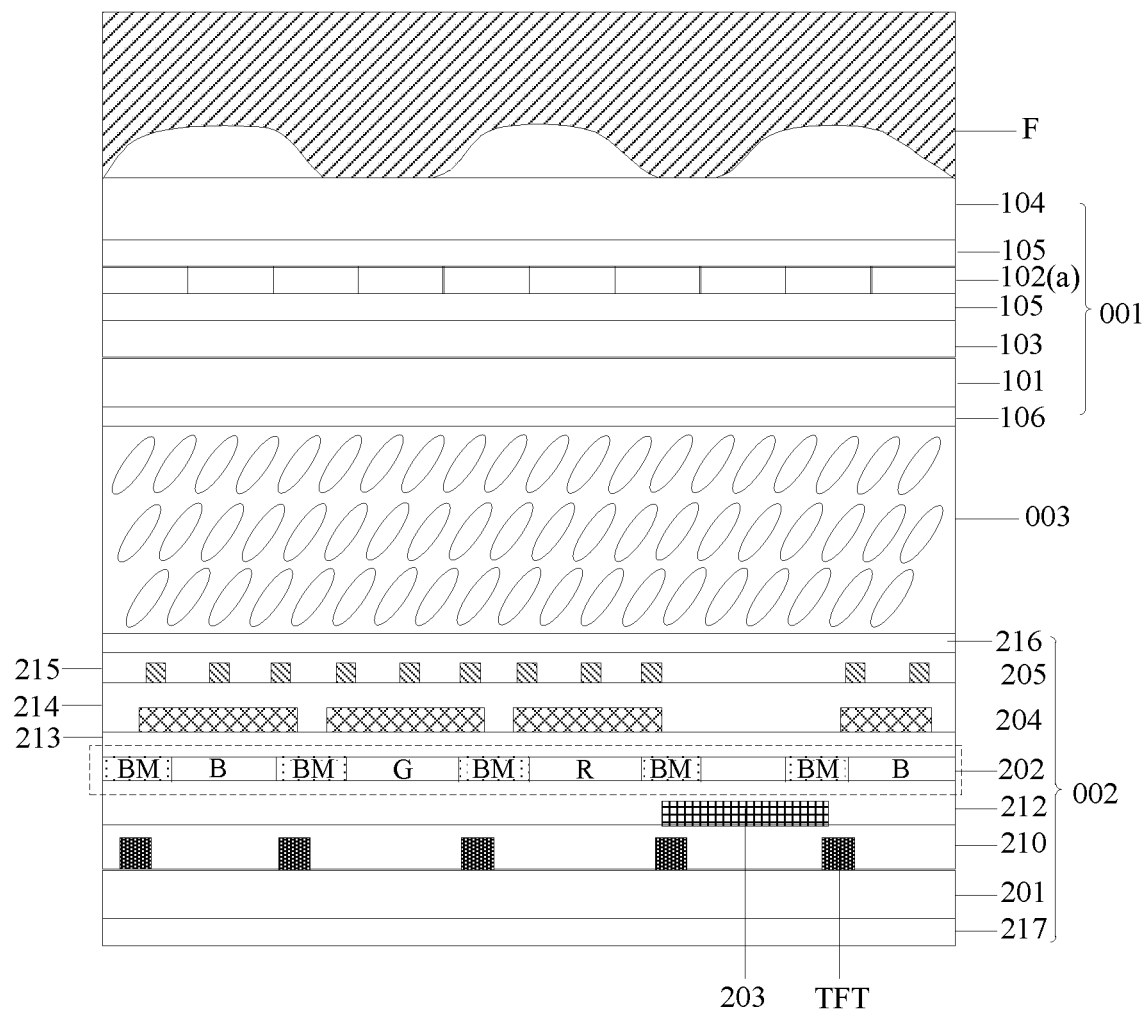
FIG. 6 is yet another schematic sectional view along a line I-II in FIG. 1.
Figure 7:
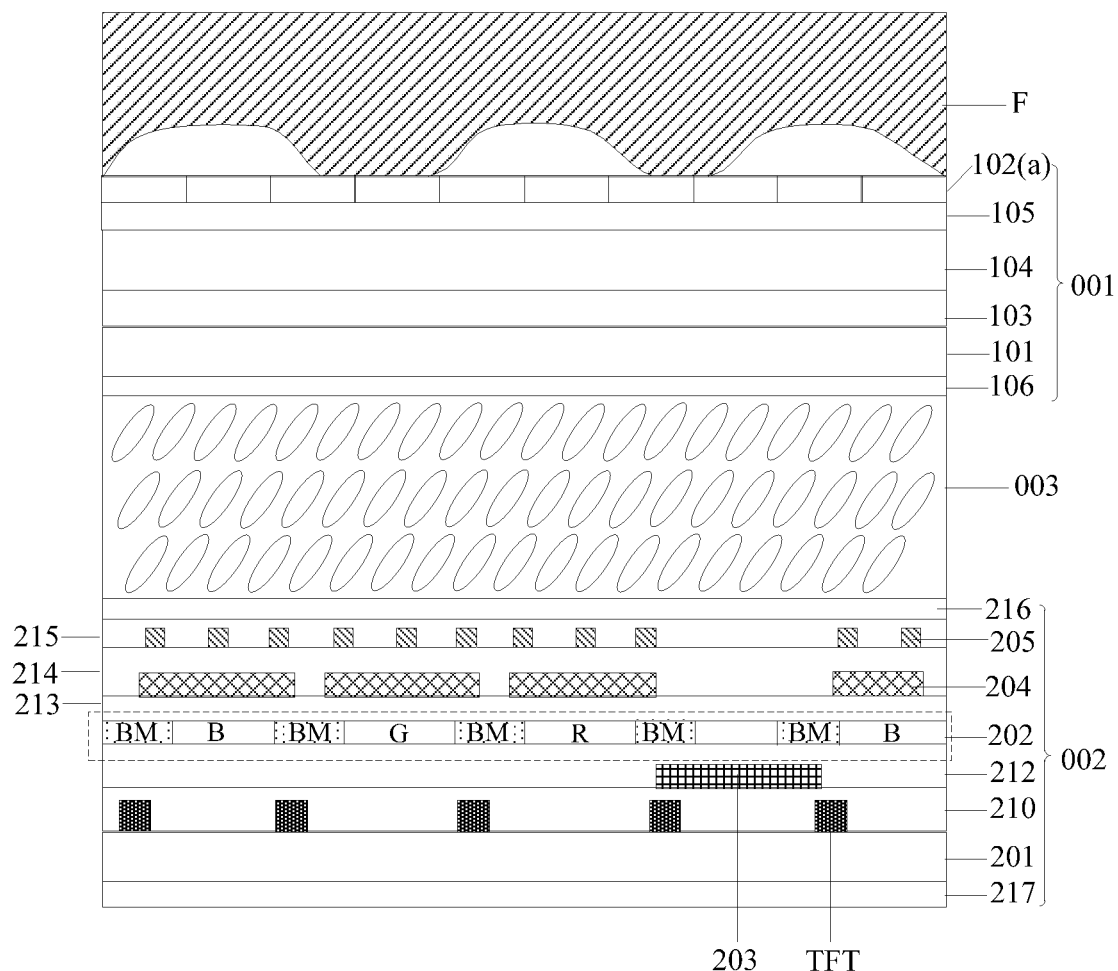
FIG. 7 is a schematic structural diagram of a collimation film provided by an embodiment of the present disclosure.

In some embodiments, as shown in FIG. 4 to FIG. 7, the light-shielding layer 102 may include: a collimation film attached to the second base substrate 101, the collimation film a may be arranged as an entire surface (as shown in FIG. 4, FIG. 6 and FIG. 7), or an orthographic projection of the collimation film a on the first base substrate 201 may be in the orthographic projection of the black matrix BM on the first base substrate 201 (as shown in FIG. 5).

Because a region between collimation holes (i.e. the second light transmitting holes $O_3$) of the collimation film is not light-transmitting, under a situation that the collimation film is arranged as an entire surface, a part of light transmittance may be lost. At this moment, an influence on a display effect may be reduced through a manner of increasing backlight brightness. Nevertheless, in order to reduce an influence on light transmittance as much as possible, the collimation film a may be arranged only in a region where the black matrix BM is located.

Figure 8:
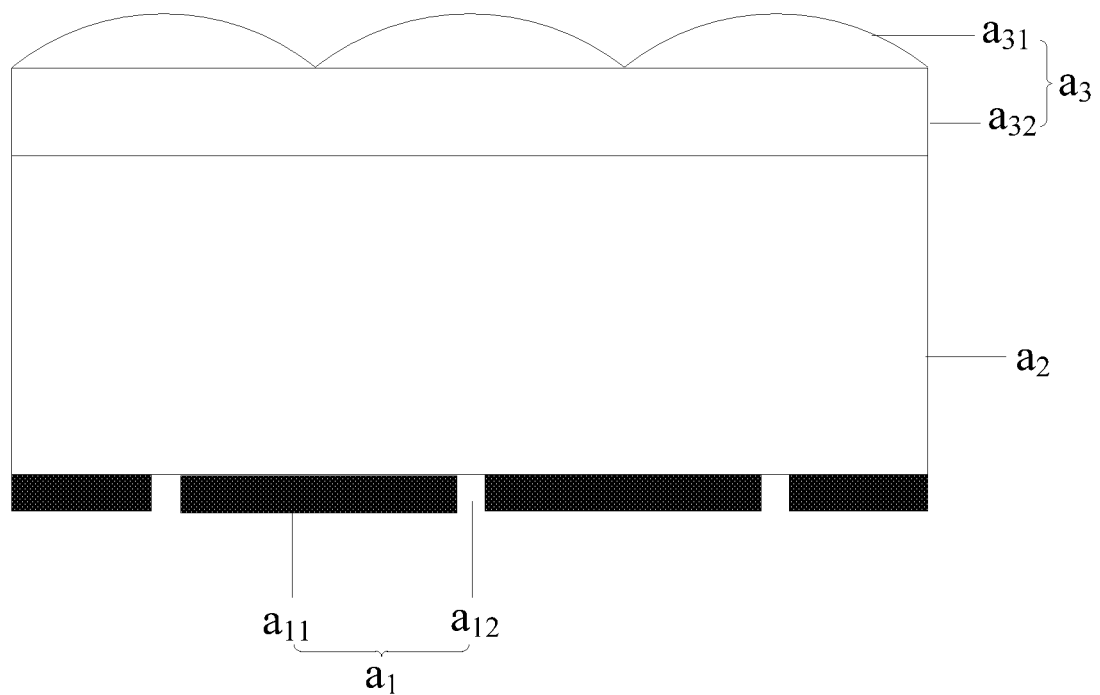
FIG. 8 is another schematic structural diagram of a collimation film provided by an embodiment of the present disclosure.
Figure 9:
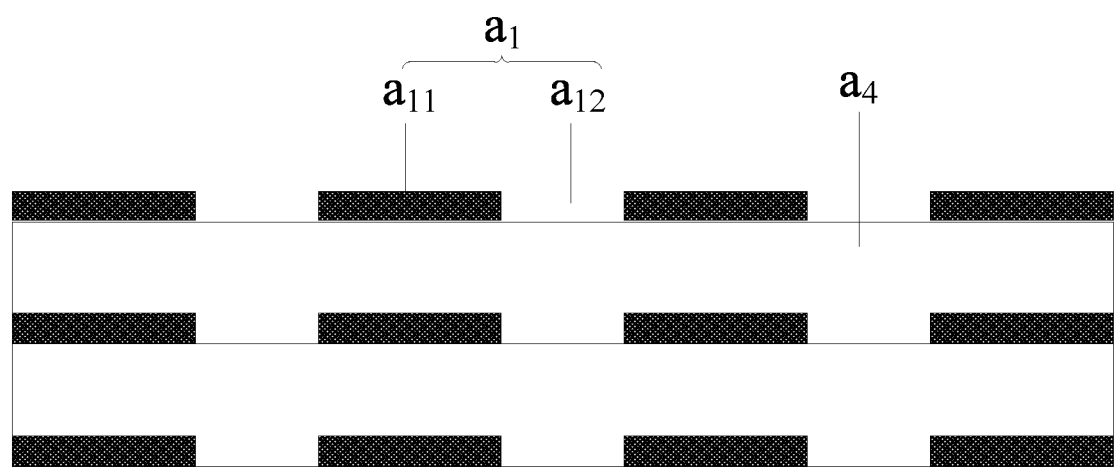
FIG. 9 is yet another schematic sectional view along a line I-II in FIG. 1.

In some embodiments, as shown in FIG. 8, the collimation film a may include: a collimation hole layer $a_1$, and a flexible basal body layer $a_2$ and a collimating lens layer $a_3$ sequentially disposed on a side of the collimation hole layer $a_1$ facing away from the second base substrate 101. The collimating lens layer $a_3$ includes a micro lens $a_{31}$ array and a spot area adjustment layer $a_{32}$ arranged between the micro lens $a_{31}$ array and the flexible basal body layer $a_2$; the collimation hole layer $a_1$ includes a plurality of light-shielding parts $a_{11}$ and a collimation hole $a_{12}$ array arranged among the light-shielding parts $a_{11}$, the collimation hole $a_{12}$ array is roughly identical to the micro lens $a_{31}$ array in distribution, and each collimation hole $a_{12}$ in the collimation hole array is on a primary optical axis of a corresponding micro lens $a_{31}$; and the collimation holes are the second light transmitting holes $O_3$, and in a region where the photosensitive sensors 203 are located, orthographic projections of the correspondingly arranged collimation hole $a_{12}$, the micro lens $a_{31}$ and the first light-transmitting hole $O_2$ on the first base substrate overlap with each other. Or, as shown in FIG. 9, the collimation film a may include at least two collimation hole layers $a_1$ arranged in a laminated mode and a light transmitting layer $a_4$ arranged between every two adjacent collimation hole layers $a_1$. Each collimation hole layer $a_1$ includes a plurality of light-shielding parts $a_{11}$ and a collimation hole $a_{12}$ array arranged among the light-shielding parts $a_{11}$; the collimation hole $a_{12}$ arrays is roughly identical in distribution, and centers of orthographic projections of correspondingly arranged collimation holes on the first base substrate 201 roughly coincide with each other; and the collimation holes are the second light transmitting holes $O_3$, and in the region where the photosensitive sensors 203 are located, an orthographic projection of each collimation hole $a_{12}$ on the first base substrate 201 correspondingly overlaps with an orthographic projection of the corresponding first light transmitting hole $O_2$ on the first base substrate 201.

In some embodiments, as shown in FIG. 4 to FIG. 7, the opposing substrate may further include: a polarizer 103 and a protective cover plate 104 disposed on a side of the second base substrate 101 facing away from the liquid crystal layer 003. In some embodiments, in order to facilitate attachment of the collimation film a, the collimation film a may be arranged between the second base substrate 101 and the first polarizer 103, arranged between the first polarizer 103 and the protective cover plate 104, or disposed on a side of the protective cover plate 104 facing away from the second base substrate 101, which is not limited here. In addition, when the collimation film a is on the side of the protective cover plate 104 facing away from the second base substrate 101, in order to avoid a situation that the collimation film a is scratched during a use process and affects a collimation effect, a protective film may be attached to the collimation film a.

In some embodiments, transparent optical clear adhesive (OCA) may be adopted to be attached to the collimation film a, and as shown in FIG. 4 to FIG. 7, the opposing substrate may further include: an adhesive layer 105 disposed on a side of the collimation film a facing the second base substrate 101, and/or an adhesive layer 105 disposed on a side of the collimation film a away from the second base substrate 101.

Figure 10:
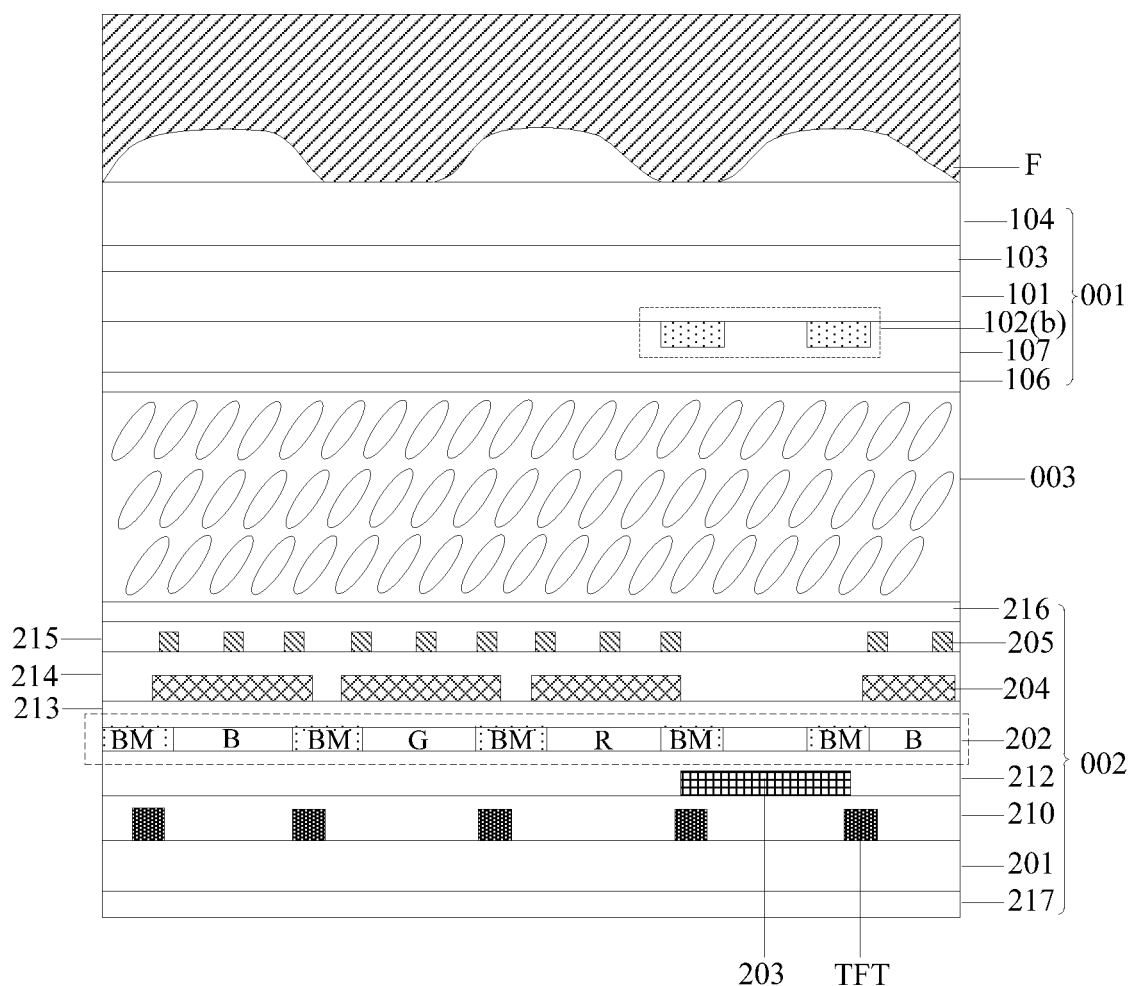
FIG. 10 is yet another schematic sectional view along a line I-II in FIG. 1.
Figure 11:
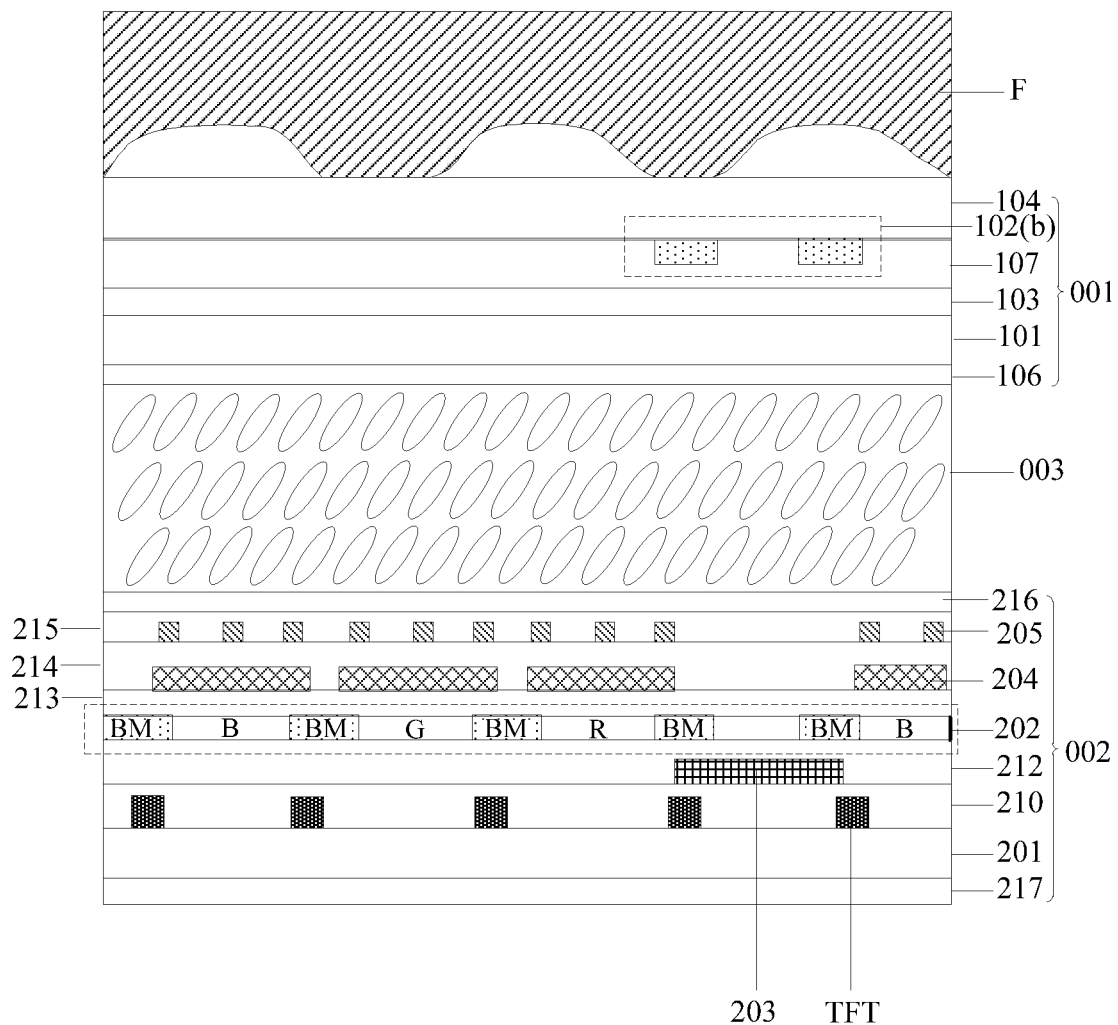
FIG. 11 is yet another schematic sectional view along a line I-II in FIG. 1.

In some embodiments, as shown in FIG. 10 and FIG. 11, the light-shielding layer 102 may include: a light-shielding pattern b formed through patterning on the second base substrate 101. An orthographic projection of the light-shielding pattern b on the first base substrate 201 is in the orthographic projection of the black matrix BM on the first base substrate 201, so that when the light-shielding layer 102 achieves the collimation effect, the light transmittance of the display panel will not be affected.

In some embodiments, in order to facilitate fabrication of the light-shielding pattern b, as shown in FIG. 10, the light-shielding pattern b may be disposed on a side of the second base substrate 101 facing the liquid crystal layer 003; or, as shown in FIG. 11, the light-shielding pattern b may also be disposed on a side of the protective cover plate 104 facing the liquid crystal layer 003.

Figure 12:
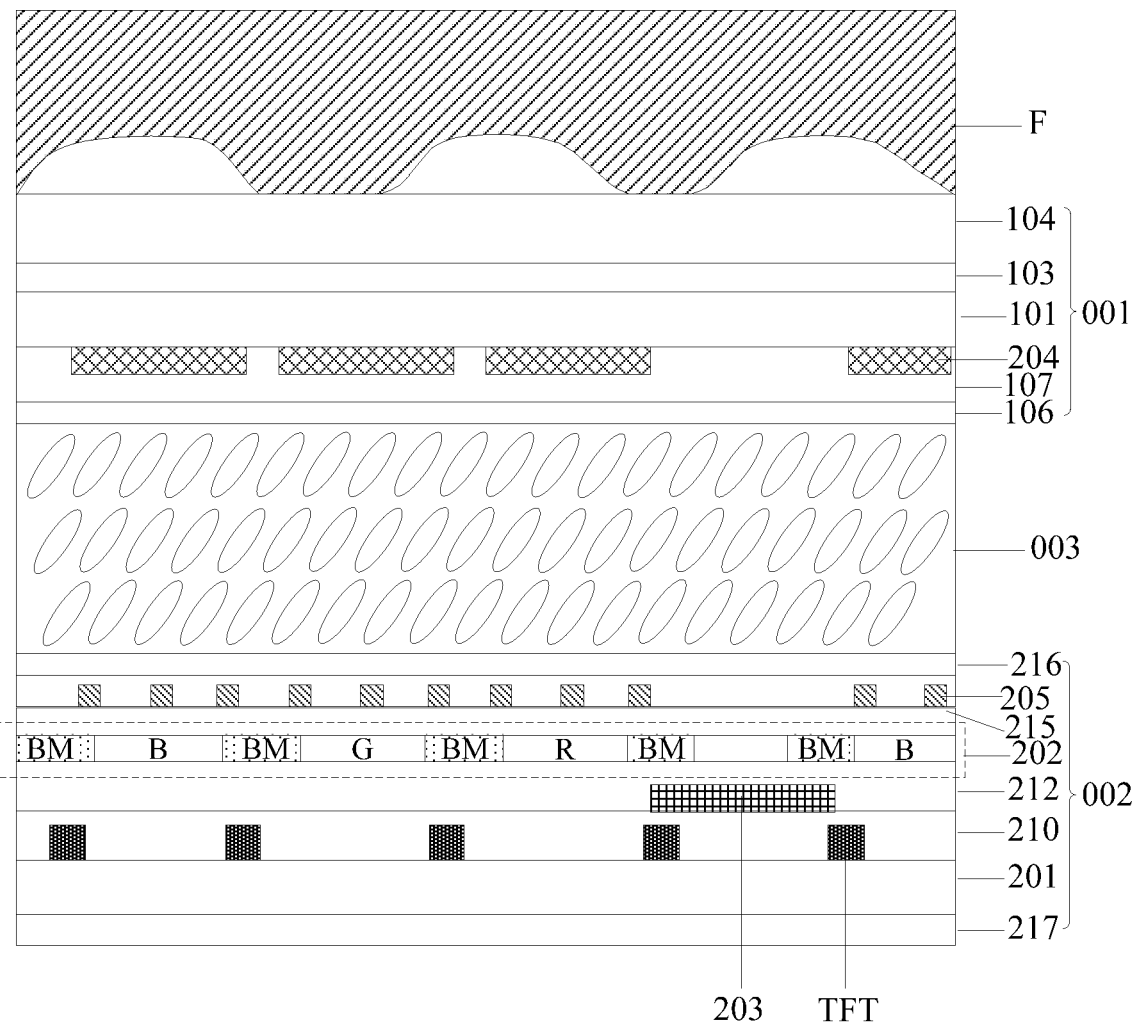
FIG. 12 is yet another schematic sectional view along a line I-II in FIG. 1.

In some embodiments, the above display panel provided by the embodiment of the present disclosure may be applied to an advanced super dimension switch (ADS) mode. As shown in FIG. 2, FIG. 4 and FIG. 11, the array substrate 002 may further include: a common electrode 204 and a plurality of pixel electrodes 205. The plurality of pixel electrodes 205 are disposed on a side of the color film layer 202 facing away from the first base substrate 201, and the common electrode 204 is arranged between a layer where the plurality of pixel electrodes 205 are located and the color film layer 202; and orthographic projections of the pixel electrodes 205 on the first base substrate 201 mutually overlap with an orthographic projection of the common electrode 204 on the first base substrate 201 at the pixel openings $O_1$. Or, the above display panel provided by the embodiment of the present disclosure may also be applied to a twisted nematic (TN) mode. As shown in FIG. 12, the array substrate 002 may further include: a plurality of pixel electrodes 205 disposed on the side of the color film layer 202 facing away from the first base substrate 201; orthographic projections of the pixel electrodes 205 on the first base substrate 201 are in orthographic projections of the color resistors on the first base substrate 201; and the opposing substrate 001 may further include: a first orientation layer 106 and a common electrode 204, where the first orientation layer 106 is in contact with the liquid crystal layer 003, and the common electrode 204 is disposed on a side of the first orientation layer 106 facing away from the liquid crystal layer 003.

Figure 13:
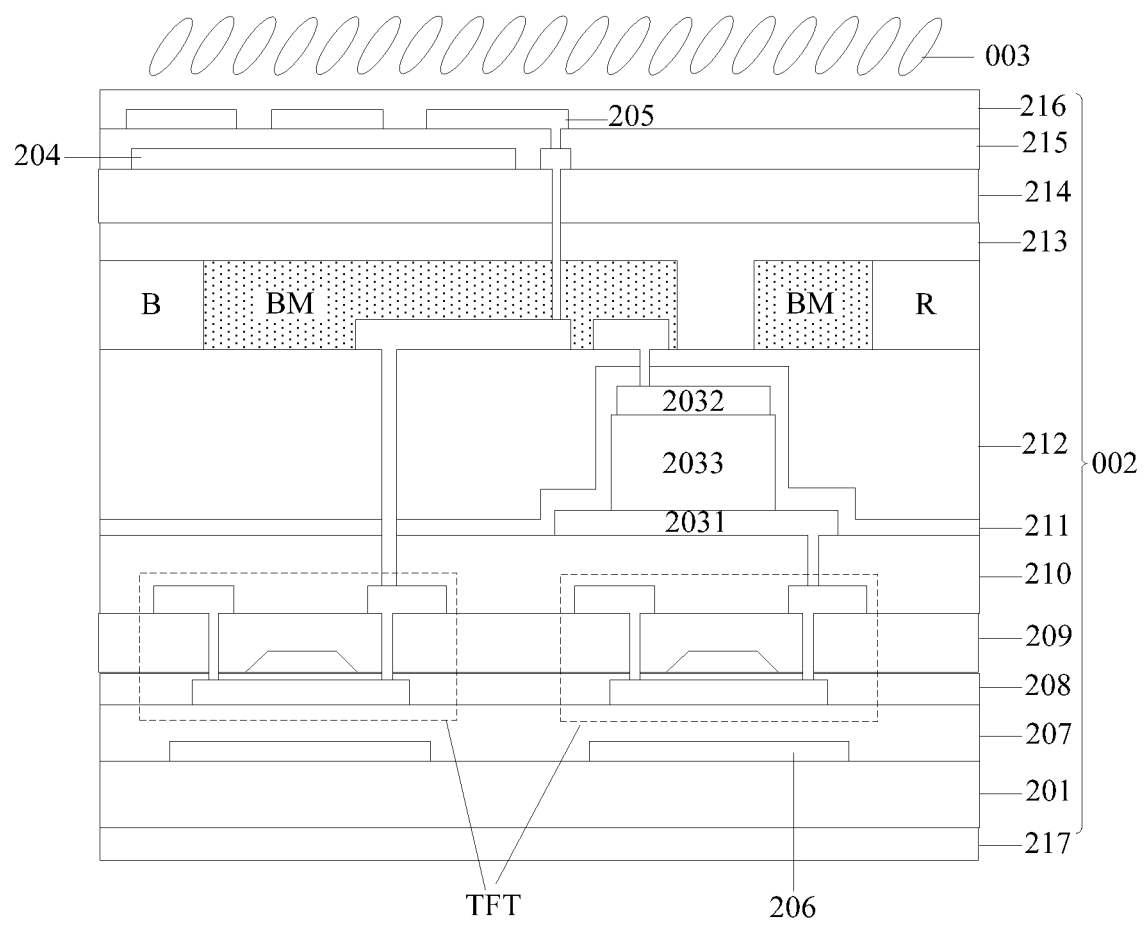
FIG. 13 is an enlarged schematic structural diagram of a zone Z in FIG. 2.

In some embodiments, as shown in FIG. 13, each of the plurality of photosensitive sensors 203 may include a first electrode 2031 and a second electrode 2032 arranged opposite to each other, and a photosensitive layer 2033 arranged between the first electrode 2031 and the second electrode 2032; and the photosensitive layer 2033 includes a P-type semiconductor layer, an intrinsic semiconductor layer and an N-type semiconductor layer which are arranged in a laminated mode. The P-type semiconductor layer is located between the first electrode 2031 and the intrinsic semiconductor layer, and the N-type semiconductor layer is located between the intrinsic semiconductor layer and the second electrode 2032; or, the N-type semiconductor layer is located between the first electrode 2031 and the intrinsic semiconductor layer, and the P-type semiconductor layer is located between the intrinsic semiconductor layer and the second electrode 2032.

It should be noted that, the photosensitive sensors 203 in the present disclosure may be the above photosensitive devices with a PIN structure, and may also be organic photosensitive sensors or other types of photosensitive sensors, which is not limited here. In addition, the photosensitive sensors 203 may be driven by a pixel circuit of any driving manner in an active type (APS) or a passive type (PPS).

Figure 14:
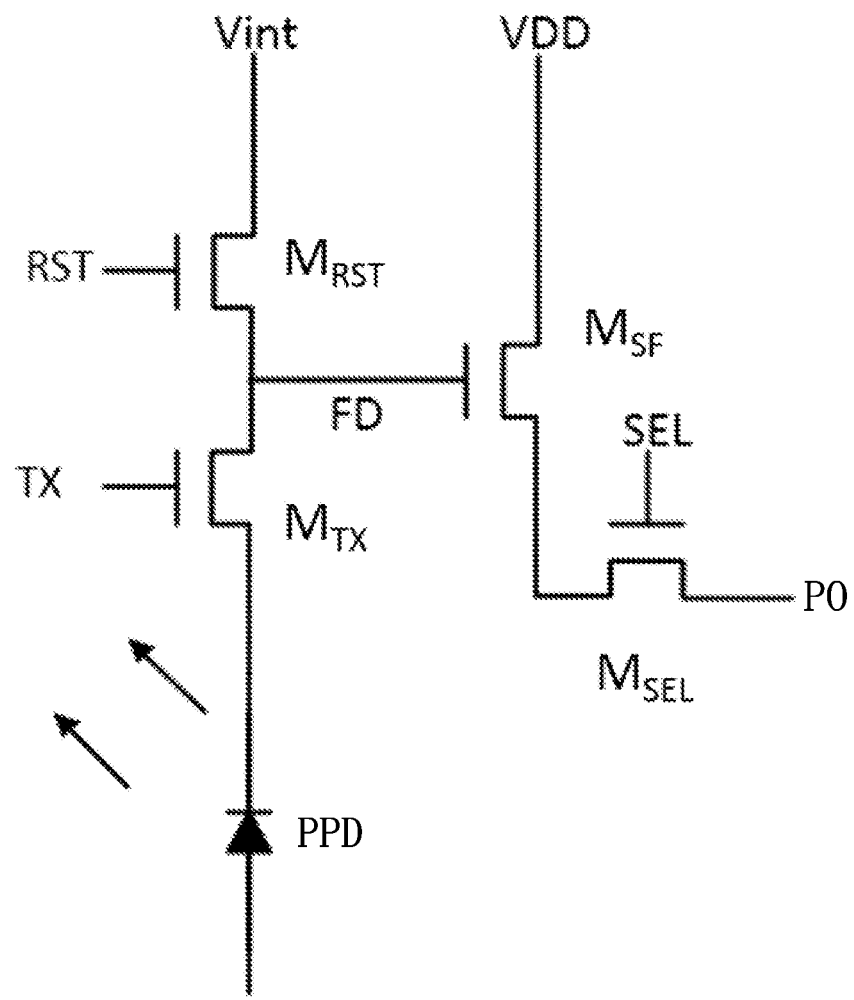
FIG. 14 is a structural diagram of a pixel circuit of a photosensitive device.
Figure 15:
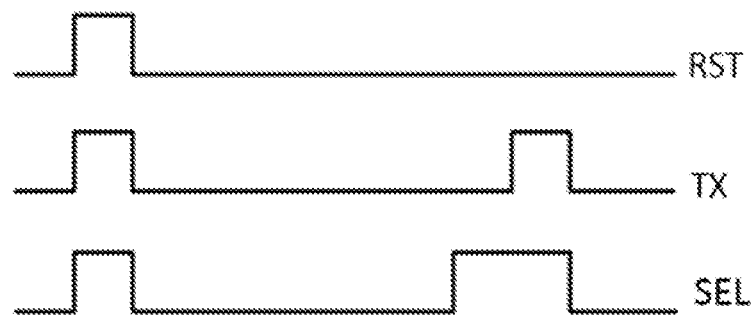
FIG. 15 is a working time sequence diagram of the pixel circuit shown in FIG. 14.

FIG. 14 and FIG. 15 are principle diagram and a driving time sequence of an APS pixel circuit. Specifically speaking: the APS pixel circuit shown in FIG. 14 is composed of a pinned-photodiode (PPD)—i.e. the photosensitive sensor 203, a pass transistor $M_{TX}$, a reset transistor $M_{RST}$, a source follower $M_{SF}$, and a row selection transistor MSEL. This type of 4T-APS pixel circuit is characterized in that the pass transistor $M_{TX}$ may effectively reduce a thermal noise and a dark current of a pixel, and the source follower $M_{SF}$ plays a role in buffer amplification, which may amplify a current generated by the pinned-photodiode PPD and output it. A working time sequence of 4T-APS pixels is as shown in FIG. 15, and may be divided into three stages of reset, integration, and transfer. In a reset stage, a reset signal terminal RST=1, a transmission control signal terminal TX=1, the reset transistor $M_{RST}$ and the pass transistor $M_{TX}$ are conducted, a FD node is reset, and the pinned-photodiode PPD is clamped to prepare for collection of photo-generated charges; in an integration stage, the reset signal terminal RST=0, the transmission control signal terminal TX=0, the reset transistor $M_{RST}$ and the $M_{TX}$ transistor are turned off, the photo-generated charges are collected by the pinned-photodiode PPD, a scanning signal terminal SEL=1, the row selection transistor $M_{SEL}$ is turned on, and a reset signal of the FD node is output to a column line PO through the source follower $M_{SF}$, that is, the pixels in the reset stage output a voltage; in a transfer stage, the transmission control signal terminal TX=1, the pass transistor $M_{TX}$ is turned on, and the photo-generated charges accumulated by the pinned-photodiode PPD are transferred to the FD node, a charge signal is converted into a voltage signal, and a voltage of the FD node (a voltage in the integration stage) is output to the column line PO through the source follower $M_{SF}$ again.

It should be noted that in the above description, 1 represents a high-level signal, and 0 represents a low-level signal. Specifically, 1 and 0 represent logic levels, only for better explanation of a work process of the above-mentioned APS pixel circuit, rather than a potential applied to a gate of each transistor during specific implementation.

Generally, in the above display panel provided by the embodiment of the present disclosure, as shown in FIG. 2 to FIG. 13, the array substrate may further include: a light blocking layer 206, a buffer layer 207, a pixel transistor TFT, a gate insulating layer 208, an interlayer insulating layer 209, a first planarization layer 210, a protective layer 211, a second planarization layer 212, an organic insulating layer (OC) 213, a first insulating layer 214, a second insulating layer 215, a second orientation layer 216 and a second polarizer 217. The opposing substrate may further include a fourth planarization layer 107. Other essential components of the display panel should be understood by those of ordinary skill in the art, and will not be repeated here, nor should they be used as limitations to the present disclosure.

Figure 16:
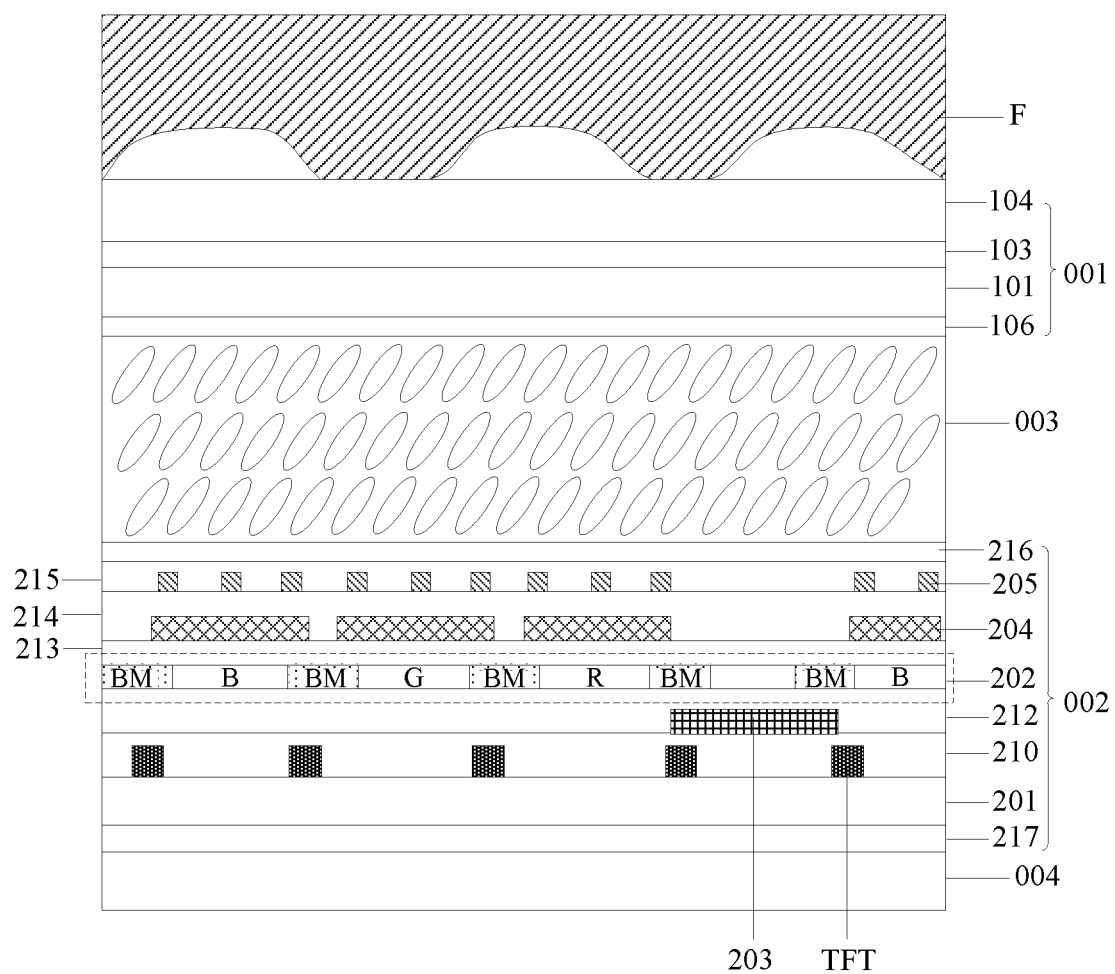
FIG. 16 is a schematic structural diagram of a display apparatus provided by an embodiment of the present disclosure.

Based on the same inventive concept, an embodiment of the present disclosure further provides a display apparatus, as shown in FIG. 16, including the above display panel provided by the embodiment of the present disclosure and a backlight module 004. The display panel is disposed on a light emitting side of the backlight module 004. In some embodiments, the backlight module 004 may be a direct type backlight module, or may also be an edge type backlight module, which is not limited here. Moreover, since a principle of problem solving of the display apparatus is similar to a principle of problem solving of the above display panel, for implementation of the display apparatus, reference may be made to the above embodiment of the display panel, and repetition will not be made.

In some embodiments, the above display apparatus provided by the embodiment of the present disclosure may be: a mobile phone, a tablet computer, a television, a monitor, a notebook computer, a digital photo frame, a navigator, a smart watch, a fitness wristband, a personal digital assistant or any other product or component with a display function. The display apparatus provided by the embodiment of the present disclosure may further include, but is not limited to, a radio frequency unit, a network module, an audio output unit, an input unit, a sensor, a display unit, a user input unit, an interface unit, a memory, a processor, a power supply, and other components. Those of skill in the art can understand that the composition of the above display apparatus does not constitute a limitation on the display apparatus, and the display apparatus may include more or less of the above components, or combine some components, or arrange different components.

Obviously, those of skill in the art can make various changes and modifications to the embodiments of the present disclosure without departing from the spirit and scope of the embodiments of the present disclosure. Thus, provided that these changes and modifications of the embodiments of the present disclosure fall within the scope of the claims of the present disclosure and their equivalents, the present disclosure is also intended to cover such changes and modifications.

What is claimed is:

1. A display panel, comprising: an opposing substrate and an array substrate arranged opposite to each other, and a liquid crystal layer located between the opposing substrate and the array substrate, wherein the array substrate comprises:
   a first base substrate;
   a color film layer, disposed on the first base substrate, wherein the color film layer comprises a black matrix and a plurality of color resistors, the black matrix comprises a plurality of pixel openings and a plurality of first light transmitting holes, and each of the plurality of color resistors is arranged in each of the plurality of pixel openings correspondingly; and
   a plurality of photosensitive sensors, disposed between the color film layer and the first base substrate, wherein orthographic projections of the plurality of photosensitive sensors on the first base substrate are in an orthographic projection of the black matrix on the first base substrate, and an orthographic projection of each of the plurality of photosensitive sensors on the first base substrate covers an orthographic projection of at least one of the plurality of first light transmitting holes on the first base substrate;
   wherein the opposing substrate comprises: a second base substrate; and a light-shielding layer, disposed on the second base substrate; wherein the light-shielding layer comprises a plurality of second light transmitting holes; and orthographic projections of the plurality of second light transmitting holes on the first base substrate mutually overlap with orthographic projections of the plurality of first light transmitting holes on the first base substrate;
   wherein the light-shielding layer comprises: a collimation film attached to the second base substrate; wherein the collimation film is arranged as an entire surface; or an orthographic projection of the collimation film on the first base substrate is in the orthographic projection of the black matrix on the first base substrate;
wherein the collimation film comprises:
a collimation hole layer; and
a flexible basal body layer and a collimating lens layer sequentially disposed on a side facing away from the second base substrate, of the collimation hole layer; wherein
the collimating lens layer comprises: a micro lens array, and a spot area adjustment layer arranged between the micro lens array and the flexible basal body layer;
the collimation hole layer comprises: a plurality of light-shielding parts, and a collimation hole array arranged among the light-shielding parts, wherein the collimation hole array is roughly identical to the micro lens array in distribution, and each collimation hole in the collimation hole array is on a primary optical axis of a corresponding micro lens; and
the collimation holes are the second light transmitting holes, and in a region where the photosensitive sensors are located, orthographic projections of the correspondingly arranged collimation hole, the micro lens and the first light-transmitting hole on the first base substrate overlap with each other.

2. The display panel according to claim 1, wherein the orthographic projections of the plurality of second light transmitting holes on the first base substrate roughly coincide with the orthographic projections of the plurality of first light transmitting holes on the first base substrate; and
centers of the orthographic projections of the plurality of second light transmitting holes on the first base substrate roughly coincide with centers of the orthographic projections of the plurality of first light transmitting holes on the first base substrate.

3. The display panel according to claim 1, wherein the collimation film comprises at least two collimation hole layers arranged in a laminated mode and a light transmitting layer arranged between every two adjacent collimation hole layers; wherein
each collimation hole layer comprises a plurality of light-shielding parts and a collimation hole array arranged among the light-shielding parts;
the collimation hole array is roughly identical in distribution, and centers of orthographic projections of correspondingly arranged collimation holes on the first base substrate roughly coincide with each other; and
the collimation holes are the second light transmitting holes, and in a region where the photosensitive sensors are located, an orthographic projection of each collimation hole on the first base substrate correspondingly overlaps with an orthographic projection of the first light transmitting hole on the first base substrate.

4. The display panel according to claim 1, wherein the opposing substrate further comprises: a polarizer disposed on a side facing away from the liquid crystal layer, of the second base substrate; and
the collimation film is arranged between the second base substrate and the polarizer.

5. The display panel according to claim 1, wherein the opposing substrate further comprises: a polarizer and a protective cover plate disposed on a side facing away from the liquid crystal layer, of the second base substrate; and
the collimation film is arranged between the polarizer and the protective cover plate; or
the collimation film is disposed on a side facing away from the second base substrate, of the protective cover plate.

6. The display panel according to claim 1, wherein the opposing substrate further comprises: an adhesive layer disposed on a side facing the second base substrate, of the collimation film; and
an adhesive layer disposed on a side facing away from the second base substrate, of the collimation film.

7. The display panel according to claim 1, wherein the light-shielding layer comprises: a light-shielding pattern formed through patterning on the second base substrate; wherein
an orthographic projection of the light-shielding pattern on the first base substrate is in the orthographic projection of the black matrix on the first base substrate.

8. The display panel according to claim 7, wherein the light-shielding pattern is disposed on a side facing the liquid crystal layer, of the second base substrate.

9. The display panel according to claim 7, wherein the opposing substrate further comprises a protective cover plate disposed on a side of facing away from the liquid crystal layer, the second base substrate; and
the light-shielding pattern is disposed on a side facing the liquid crystal layer, of the protective cover plate.

10. The display panel according to claim 1, wherein shapes of the first light transmitting holes and the second light transmitting holes are circular, and hole diameters of the first light transmitting holes and the second light transmitting holes range from 3 μm to 6 μm.

11. The display panel according to claim 1, wherein the array substrate further comprises: a common electrode and a plurality of pixel electrodes; wherein
the plurality of pixel electrodes are disposed on a side facing away from the first base substrate, of the color film layer; and the common electrode is arranged between a layer where the plurality of pixel electrodes are located and the color film layer; and
orthographic projections of the pixel electrodes on the first base substrate mutually overlap with an orthographic projection of the common electrode on the first base substrate at the pixel openings.

12. The display panel according to claim 1, wherein the array substrate further comprises: a plurality of pixel electrodes disposed on the side facing away from the first base substrate, of the color film layer; wherein
orthographic projections of the pixel electrodes on the first base substrate are in orthographic projections of the color resistors on the first base substrate; and
the opposing substrate further comprises: an orientation layer and a common electrode, wherein the orientation layer is in contact with the liquid crystal layer, and the common electrode is disposed on a side facing away from the liquid crystal layer, of the orientation layer.

13. The display panel according to claim 1, wherein each of the plurality of photosensitive sensors comprises a first electrode and a second electrode arranged opposite to each other, and a photosensitive layer arranged between the first electrode and the second electrode; wherein
the photosensitive layer comprises a P-type semiconductor layer, an intrinsic semiconductor layer and an N-type semiconductor layer which are arranged in a laminated mode.

14. A display apparatus, comprising the display panel according to claim 1, and a backlight module, wherein the display panel is disposed on a light emitting side of the backlight module.

15. The display panel according to claim 1, wherein the opposing substrate further comprises: an adhesive layer disposed on a side facing the second base substrate, of the collimation film; or an adhesive layer disposed on a side facing away from the second base substrate, of the collimation film.

16. The display apparatus according to claim 14, wherein the orthographic projections of the plurality of second light transmitting holes on the first base substrate roughly coincide with the orthographic projections of the plurality of first light transmitting holes on the first base substrate; and centers of the orthographic projections of the plurality of second light transmitting holes on the first base substrate roughly coincide with centers of the orthographic projections of the plurality of first light transmitting holes on the first base substrate.

\* \* \* \* \*